OPTICALLY SCANNED FERROMAGNETIC MEMORY APPARATUS

Filed Aug. 15, 1963 6 Sheets-Sheet 1

INVENTORS J. T. H. CHANG
U. F. GIANOLA

BY Roy M. Porter Jr.

ATTORNEY

FIG. 3 FRONT

SCAN SEQUENCE TABLE

| TIME | LIGHT BEAM POSITION |
|---|---|
| $t_1$ | II — 4 |
| $t_2$ | III — 4 |
| $t_3$ | IV — 4 |

OPTICALLY SCANNED FERROMAGNETIC MEMORY APPARATUS

Filed Aug. 15, 1963 6 Sheets-Sheet 6

SCAN SEQUENCE TABLE

| TIME | LIGHT BEAM POSITION |
| --- | --- |
| $t_1$ | II–4 |
| $t_2$ | III–4 |
| $t_3$ | IV–4 |

United States Patent Office 3,319,235
Patented May 9, 1967

3,319,235

OPTICALLY SCANNED FERROMAGNETIC MEMORY APPARATUS

James T. H. Chang, Dunellen, and Umberto F. Gianola, Florham Park, N.J., assignors to Bell Telephone Laboratories, Incorporated, New York, N.Y., a corporation of New York Filed Aug. 15, 1963, Ser. No. 302,403
15 Claims. (Cl. 340—174)

This invention relates to the storage and recovery of information, and more particularly, to optically scanned ferromagnetic memory apparatus.

Various proposals have been made heretofore for optically scanning memory systems to obtain rapid recovery of any desired item out of a large quantity of information.

For instance, as disclosed in United States Patent No. 2,830,285 of R. C. Davis and R. E. Staehler, issued Apr. 8,1958, and in the copending application of T. J. Nelson, Ser. No. 239,948, filed Nov. 26, 1962, and assigned to the assignee hereof, a light beam may interrogate a storage surface of the photographic film or punched card type. One or more phototubes are placed behind the storage surface to detect light transmitted through it. However, whenever any of the stored information must be changed the entire film or card must be removed and a new one made incorporating the change even though most of the information stored on the film or card does not need to be changed.

One optically scanned system including means for changing individual items of information in situ is described in United States Patent No. 3,059,538, issued Oct. 23, 1962 to R. C. Sherwood and H. J. Williams. However, even though the stored information may be recovered rapidly, the original storing or changing of information is relatively slow, since a magnetizable stylus must be moved from point to point. Furthermore, the immediate output of the storage unit is still optical in nature and must be subsequently reduced to an electrical signal in order to be usable with conventional computing equipment.

Other optically scanned memory systems provide for the storing and changing of information as rapidly as its recovery, the recovery then being inherently destructive in nature; but the operative materials of these systems generally lack a sharply defined threshold for change of their information state and are therefore subject to a gradual degradation of the stored information state with the repeated occurrence of low level optical or electrical disturbances.

It is therefore an object of this invention to obtain the advantages of optical scanning of memory systems in storing and changing selected items of information, while simultaneously providing a stable and sharply defined threshold for change of information state.

It is a further object of this invention to provide a photoresponsive magnetic memory device having a high density of information storage which can be changed under the control of the same addressing equipment which is used for read out and having storage states which exhibit the desired threshold for resisting changes by various disturbances.

According to the invention, photoconductive means are provided for obtaining access to information storage locations in a magnetic memory. Specifically, the illuminated or darkened condition of a photoconductor determines whether a specific memory element is supplied with sufficient current to translate its stored information to the output. According to a feature of the invention, a memory device may be simply laminated of photoconductive material and a high resistivity, high magnetic remanence ferromagnetic material threaded by conductors which contact the photoconductor at discrete locations.

The invention is particularly advantageous because stable switching thresholds characteristic of magnetic devices are provided in conjunction with the simplicity of a distributed photoresponsive access switch. Additional advantages obtained are that the information stored in any individual memory element may be rapidly changed in situ without disturbing the information stored in any other memory elements, and that the output of the memory unit is electrical in form and may be directly accepted by conventional computing equipment.

Various features of the invention reside in various arrangements which facilitate the discrimination of switching from nonswitching within the ferromagnetic material at the illuminated location.

Figure 1:
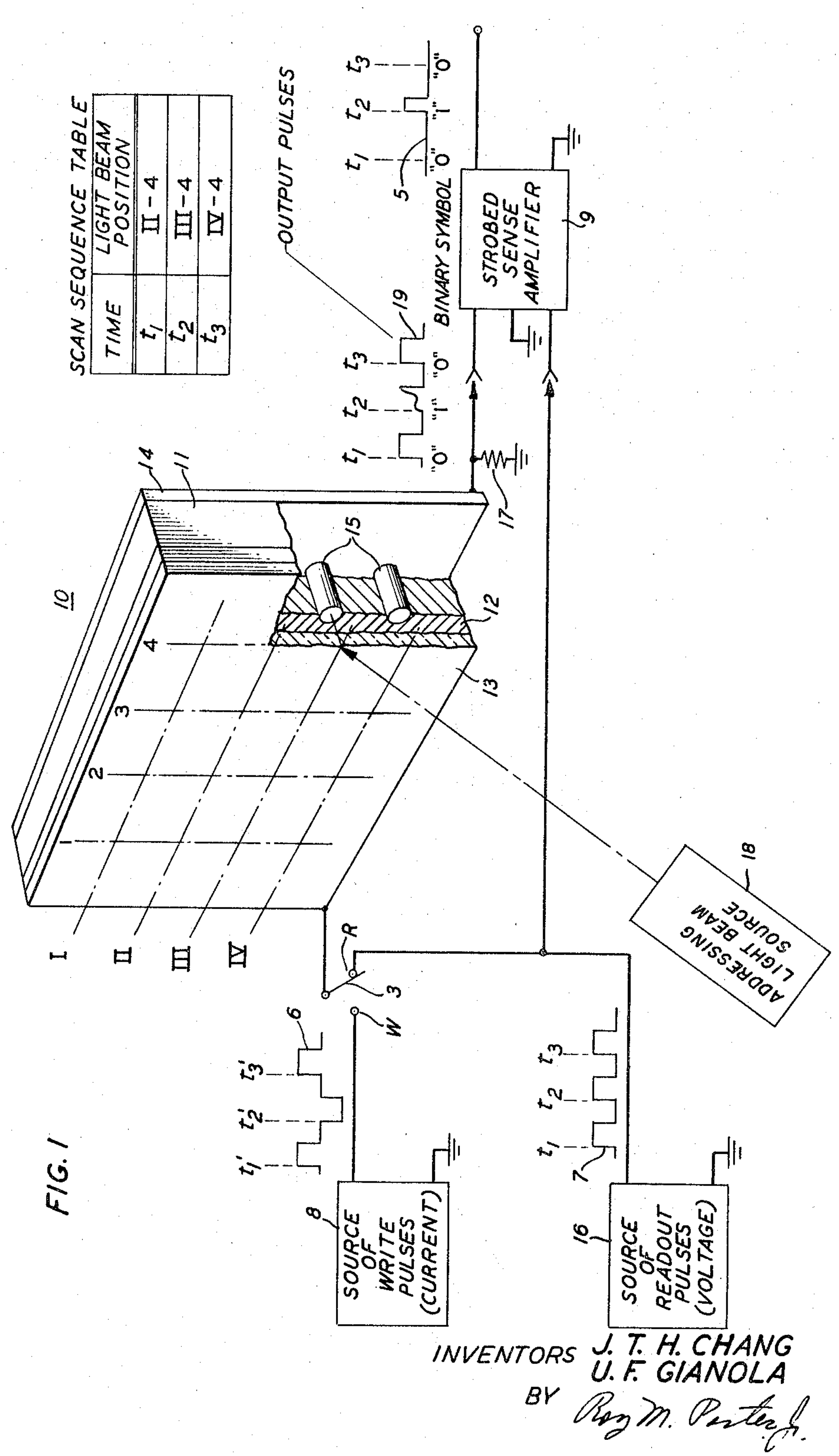
FIG. 1 is a partially cutaway perspective view of a ferromagnetic memory device according to a basic preferred embodiment of the invention, accompanying circuit connections being shown schematically and block diagrammatically.

In FIG. 1, the essential operative layers of laminated memory device 10 are a square loop magnetic material 11 know as a ferrite and photoconductor 12. Transverse conductors 15 extend through ferrite 11 and electrically contact photoconductor 12 at each crosspoint of the vertical axis coordinates I, II, III and IV and the horizontal axis coordinates 1, 2, 3 and 4. The light beam is focused and deflected to illuminate only one of the coordinate crosspoints, as in the above-cited patent of Davis and Staehler, or in the above-cited application of Nelson. Also, the photoconductor 12 is much thinner than the spacing between crosspoints, so that the lateral resistances in photoconductor 12 betwen the illuminated crosspoint and neighboring crosspoints are substantially greater than the resistance of a portion of the photoconductor, current to the surface of ferrite 11 at the illuminated crosspoint under all conditions. Wherever the light beam lowers the resistance of a portion of the photoconductor, current may be caused to flow readily through it and the adjacent transverse conductor 15. Appropriate choice of the current will allow switching of a direction of magnetization of ferrite 11 which is opposed to the field of the current within a volume around that conductor 15 which is exclusive of any similar volume around any other conductor 15. This conductor 15 and its surrounding volume of ferrite 11 may be called a magnetic storage site, and the magnetic storage site is said to be addressed by the light beam.

The electrodes 13 and 14 and the pulse sources 8 and 16 are illustrative ways of completing a circuit for the current through the addressed site as will be more fully explained hereinafter.

Since a particular current is required to define the volume of ferrite 11 in which the directon of magnetization may be switched, the input information is impressed on device 10 as current pulses of that particular magnitude by source 8. This process is known as writing.

To recover, or read out, the stored information of particular magnetic storage sites, applicants provide that the light beam will again address those sites. With suitable voltage bias, such as provided by voltage pulse source 16, across photoconductor 12, transverse conductors 15 and output resistor 17, the output current in resistor 17 will be momentarily less when switching of the direction of magnetization occurs in the addressed memory site than when such switching does not occur. The retarded rise of the current is obtained because switching the direction of magnetization of the material around a transverse conductor 15 throughout its length gives that conductor 15 momentarily a very large inductive impedance which opposes the flow of current therethrough.

The leakage currents flowing through the dark portions of photoconductor 12 are not large enough to change the direction of magnetization of any nonaddressed magnetic site. They generate, however, a sort of delta noise which hinders detection of the switching of a single site in a large memory. Therefore, applicants have devised several ways to improve the detection of switching in the ferrite, such as the use of transformer-type coupling within ferrite 11 as shown in FIGS. 3 through 6, this type of coupling being primarily sensitive to the switching of the direction of magnetization within the surrounding magnetic material. As shown in FIGS, 2, 5, 6 and 7, applicants have also used separate output detectors for different subgroups of memory sites within a large memory to facilitate detection of switching of the direction of magnetization within a memory site.

More specifically, in FIG. 1, layer 11 may be a magnesium-manganese-zinc ferrite of the type disclosed in Albers-Schoenberg Patent No. 2,981,689, issued Apr. 25, 1961. Such a material commonly has a substantially rectangular magnetic hysteresis characteristic, or, in other words, magnetic remanence approaching its saturation magnetization, and a very high electrical resistivity.

The holes or apertures in layer 11 for receiving conductors 15 may be produced by any of several techniques. However, in order to obtain maximum storage density, applicants utilize an electron beam milling machine for drilling the holes. Such a machine is described in United States Patent Nos. 2,771,568; 2,793,281 and 2,793,282. In one basic embodiment of the invention, holes 0.001 inch in diameter are drilled in a rectangular array with 0.003 inch center distances. For a ferrite slab 0.010 inch thick, representative machine parameters may be the following: pulse frequency, 500 cycles per second; pulse width, 20$\mu$ seconds; accelerating voltage, 120 kilovolts; beam current 20$\mu$ amperes; beam spot size, 0.001 inch.

Copper conductors 15 threading these holes can, for example, be introduced by electroplating, electrolessplating, sputtering, vacuum deposition, or other printed circuit techniques. Electrolessplating is described in the copending application of R. A. Ehrhardt, Ser. No. 264,060, filed Mar. 11, 1963 and assigned to the assignee hereof.

Layer 12 is a photoconductive material, such as cadmium sulfide, lead sulphide, lead telluride, or intrinsic silicon which is plated or otherwise deposited on one surface of the ferrite slab 11. It may be called a photoconductive overlay or simply a photoconductor. Photoconductor 12 makes electrical contact with each transverse copper conductor 15 which passes through ferrite slab 11, and preferably has a uniform thickness of about one micron.

Transparent electrode 13 is likewise plated or otherwise deposited on top of and in uniform electrical contact with photoconductor 12. Transparent electrode 13 may be a conducting glass or a conducting electrolytic solution or other material which allows a beam of radiant energy to pass through in sufficient strength to have a substantial effect on the conductivity of the portion of photoconductor 12 which is illuminated by the beam. Transparent electrode 13 is separated from the transverse conductors 15 by a uniform thickness of photoconductor 12.

The embodiment of the invention shown in FIG. 1 may be modified by substituting for transparent electrode 13 either an opaque electrode with holes at the indicated crosspoints for admitting the light beam, or fine electrical wires touching photoconductor 12 at each crosspoint but casting relatively little shadow upon the photoconductor 12.

The copper electrode 14 is deposited on the opposite surface of the ferrite slab 11 and carries the output current from the transverse conductors 15 to the output resistor 17. Electrode 14 may be plated or deposited simultaneously with transverse conductors 15. The transverse conductors 15 are consequently connected in parallel between photoconductor 12 and electrode 14.

Output resistor 17 is connected between electrode 14 and ground. If separate read out circuits are desired for each memory site, or for particular sets of memory sites, the electrode 14 may be eliminated; and the transverse conductors 15 may variously be connected to separate output resistors 17.

Switch 3 connects either source 8 of writing current pulses or source 16 of read out voltage pulses across the series combination of memory device 10 and output resistor 17. Read out strobed sense amplifier 9, essentially a gated amplifier, has a first input connected across output resistor 17 and a second input connected across read out voltage pulse source 16. The voltage across resistor 17 is compared with a voltage standard in strobed sense amplifier 9. The rectangular voltage pulses across resistor 17 should equal this standard. Preferably, the voltage pulses from source 16 are used only to initiate or synchronize a gating action in sense amplifier 9. For a fraction of a pulse width after the leading edge of each pulse from source 16, the difference between the standard voltage and the voltage across resistor 17 is amplified, clipped and gated to the output of sense amplifier 9. Alternatively, sense amplifier 9 might use the voltage pulses from source 16 as the standard, in which case sense amplifier 9 should have a threshold during the gating time for blocking voltages as small as the difference between source 16 pulses and the rectangular pulses across resistor 17. In either case, the output pulses may be made as wide as the input pulses by known techniques, such as using the gated pulses to trigger a separate pulsing circuit.

In operation, information is stored in device 10 by establishing one of two possible directions of magnetization of the magnetic material surrounding each copper conductor 15. To address a particular storage site, a focused beam of light may be deflected toward each juncture of a conductor 15 with photoconductor 12, as indicated in FIG. 1 by the coordinate crosspoints, by the deflection apparatus described in the above-cited application of T. J. Nelson or by some other light beam deflection apparatus, for example a cathode ray tube or sets of electromechanically moveable mirrors.

Assume, for purposes of illustration of the writing operation, that at time $t_1$ the light beam strikes the photoconductor at crosspoint II–4. Writing current pulser 8 produces a pulse of the polarity indicated by the curve 6 in FIG. 1. It should be obvious that writing current pulser 8 may be synchronized with the light beam deflector. For example, pulser 8 may advantageously pulse a fractional pulse width after the binary pulse sources of the apparatus described in the above-cited application of T. J. Nelson, in order to allow the polarization modulators of the Nelson apparatus to stabilize. The light beam lowers the resistance of the illuminated portion of photoconductor 12, and the current pulse from writing pulser 8 is sufficient to switch the direction of magnetizatioin of the magnetic material around the transverse conductor 15 at crosspoint II–4 into alignment with the clockwise field of the current. The amplitude of the current pulse from writing pulser 8 is controlled to exceed the threshold for switching within the selected storage site but not to exceed the threshold value for swiching beyond the desired boundaries of the storage site. Therefore, interaction between the magnetization of adjacent sites is prevented.

Further assume that at time $t_2$ the beam is deflected to the next lower position, III–4, as shown by the scan sequence table of FIG. 1. Writing pulser 8 generates a pulse of negative polarity, as shown by curve 6 of FIG. 1. The current flows through conductor 15 and illuminated photoconductor 12 at crosspoint III–4 from back to front and has a counterclockwise magnetization as viewed in FIG. 1. The magnetization of the magnetic material of position III–4 will thus be established in a direction relatively opposite to that of element II–4, i.e., counterclockwise as opposed to clockwise. These two directions are taken to denote binary information states commonly denoted "0" and "1." Further assume that at time $t_3$ the beam is deflected to the next lower position, IV–4, and voltage pulser 16 produces a positive pulse, as shown in curve 6, which correspondingly magnetizes the magnetic material at position IV–4 in a clockwise direction.

Now the operation of the invention will be described for reading the stored information out of the same three magnetic storage sites in the same sequence as designated in the scan sequence table. It should be understood that the elements may be scanned or addressed in any desired sequence for both writing and reading; thus, the device according to the invention may be termed a random access memory. The local volumes of magnetic material at positions II–4 and IV–4 already have directions of magnetization which are aligned with the field of the currents which flow through their respective transverse conductors 15 from read out voltage pulser 16. The magnitude of the voltage pulses shown in curve 7 is chosen to be capable of producing switching only within the desired boundaries of the storage site. Therefore, the first and third output voltage pulses applied at times $t_1$ and $t_3$ by read out pulser 16, across output resistor 17 and device 10 produce essentially similar voltage pulses across output resistor 17. By comparing the leading edges of these pulses with a standard, strobe sense amplifier 9 interprets them as "zeros" and produces no output at times $t_1$ and $t_3$. However, as shown in curve 7, at time $t_2$ the light beam is deflected to crosspoint or position III–4 and the current produced by the voltage pulse from read out pulser 16 will act to reverse the direction of magnetization of the material at that crosspoint, since the opposite direction of magnetization had been established during the writing sequence.

The initially opposed magnetization of the material at memory site III–4 results in a high impedance to the flow of current through its transverse copper conductor 15 as switching starts and a decreased impedance after switching is complete. The corresponding voltage across output resistor 17 is thus shaped approximately as shown by the middle output pulse in curve 19 in FIG. 1. It will be noted that the height of the leading edge of the output pulse is a fraction of the height of the leading edges of the other output pulses. Strobed sense amplifier 9 compares this leading edge with the standard, interprets it as a "one," and produces an output pulse as shown in curve 5. Discrimination of "0's" and "1's" may be accomplished by other techniques, such as integrating each output pulse appearing across resistor 17 and comparing the results to a standard. Such techniques are well known in the art of memory devices.

One substantial advantage of the invention is that, if spillover of light to neighboring portions of photo-conductor 12 occurs, the switching thresholds of the neighboring magnetic storage sites will prevent them from switching, since the impedance of photoconductor 12 will not be reduced as much as it is by the central portion of the beam. These thresholds also prevent the switching of memory elements in response to dark photoconductor leakage currents which occur every time a voltage pulse is applied between electrodes 13 and 14. No matter how often these optical and electrical disturbances occur, the switching thresholds of the magnetic storage sites remain constant. There is no tendency for the magnetic material in a storage site to "walk up" its magnetic hysteresis characteristic as in some prior art photoresponsive devices.

In FIG. 1 a substantial portion of the leading edge of a "1" output pulse as shown at time $t_2$ in curve 19 is attributable to current leakage through dark portions of photoconductor 12 and the contiguous transverse copper conductors 15, particularly when device 10 includes a large number of memory elements. These leakage currents tend to mask the difference between the standard of strobed sense amplifier 9 and the leading edge of a "1" output pulse by making the percentage difference very small.

Figure 2:
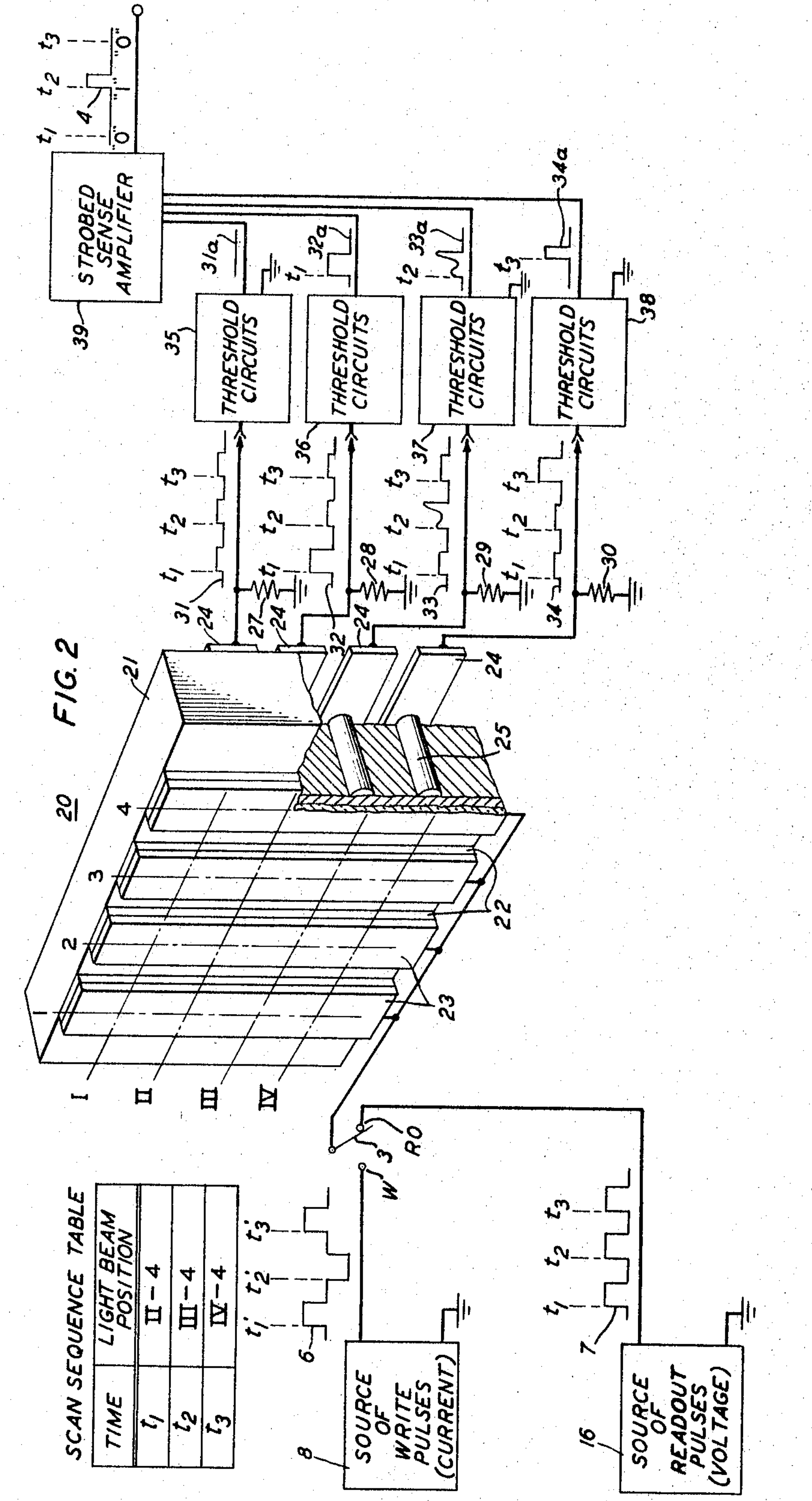
FIG. 2 is a partially cutaway perspective view of a device wherein the embodiment of FIG. 1 is modified for reducing the relative effect of leakage currents through the dark portions of the photoconductor.

One arrangement for reducing the effect of photoconductor leakage currents is illustrated in FIG. 2. Ferrite sheet 21 and the location of conductors 25 therethrough are unchanged from ferrite 11 and conductors 15 of the device of FIG. 1. In contrast to photoconductor 12 of FIG. 1, photoconductors 22 are plated in narrow vertical strips at the horizontal axis coordinate locations 1, 2, 3, and 4. The transparent electrodes 23 are plated on top of photoconductors 22. A change of even greater significance is that the output electrodes 24 are plated in narrow horizontal strips at the vertical axis coordinate locations I, II, III and IV on the surface of ferrite 21 opposite photoconductors 22. Output resistors 27, 28, 29 and 30 are connected between ground and output electrodes 24 at vertical coordinate locations I, II, III and IV, respectively. Writing and reading pulses are applied in the same manner as in FIG. 1. The advantages of this arrangement are twofold. First, the narrow width of photoconductor strips 22 reduces lateral conduction through the photoconductor 22 between any two of transverse conductors 25 in comparison to the lateral conduction through photoconductor 12 of FIG. 1. Second, the use of separate output resistors with different subgroups of memory sites allows the dark photoconductor leakage current from only one row of memory elements to flow through any one output resistor, in contrast to FIG. 1 in which all of the leakage currents flowed through output resistor 17. Similar relationships exist if output electrodes 24 are plated parallel to photoconductors 22. In either case, for a square matrix of memory elements, the leakage current in any one output resistor of the embodiment of FIG. 2 will be less than the leakage current in common output resistor 17 of FIG. 1 divided by the square root of the number of memory elements in device 10 or 20. For a one million bit device 20, the leakage currents in any one output resistor in FIG. 2 would be a thousand times less than for a one million bit device 10 of FIG. 1, solely on account of the grouping of conductors 25 by output electrodes 24. The actual leakage currents in any one output resistor are still smaller on account of the decrease in lateral photoconductor conduction.

In FIG. 2, during read out of information stored as in FIG. 1, at time $t_1$, a substantially rectangular output pulse will appear across output resistor 28, as shown in curve 32. At time $t_2$, an output pulse with a diminished leading edge will appear across output resistor 29; and, at time $t_2$, a substantially rectangular pulse will appear across resistor 30, as shown in curves 33 and 34, respectively. The dark photoconductor leakage current pulses appearing in curves 31 through 34 are eliminated by threshold circuits, 35 through 38, in all cases in which the leakage pulses appear separately from the above-described ouput pulses of the addressed memory sites. For example, the threshold circuits 35 through 38 may be vacuum tubes biased below their conduction thresholds by slightly more than the expected level of the leakage current pulses. The output pulses from the threshold circuits are then combined in the input of strobed sense amplifier 39, which produces a "one" output pulse at time $t_2$ as shown in curve 4. The input pulse shown at time $t_2$ in curve 33A of FIG. 2 has a greater percentage difference from the standard of comparison of sense amplifier 39 than the pulse at time $t_2$ in curve 19 of FIG. 1, by virtue of its reduced content of dark photoconductor leakage current, and thus, is more easily handled by sense amplifier 39. The importance of delta noise, as the leakage currents may be called, is reduced.

Figure 3:
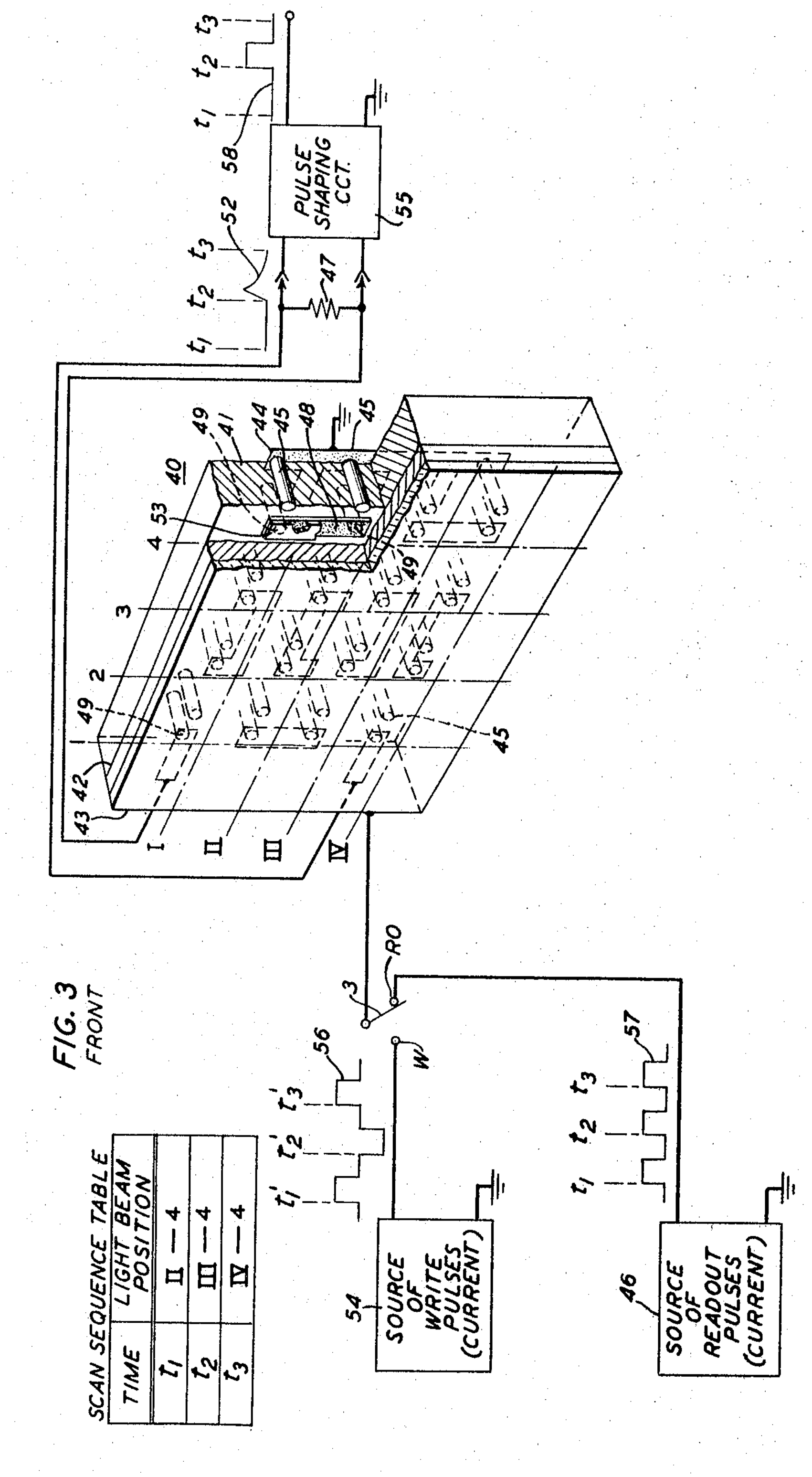
FIG. 3 is a partially cutaway perspective view of a device according to a preferred embodiment of the invention using inductive coupling for providing substantial output pulses only when ferrite switching occurs, accompanying circuit connections being shown schematically and block diagrammatically.
Figure 4:
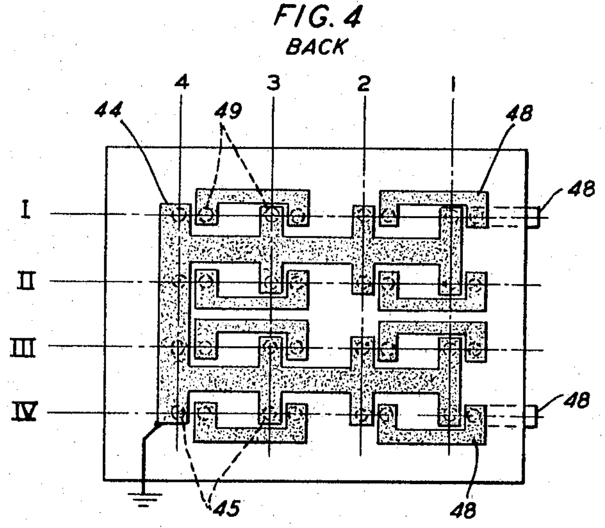
FIG. 4 is a plan view of the back of the device of FIG. 3.

A preferred embodiment of the invention using a different technique is shown in FIGS. 3 and 4. By utilization of the principle of inductive or transformer-type coupling, device 40 produces a substantial output pulse across output resistor 47 only when the direction of magnetization of the magnetic material at a memory site is switched.

The arrangement of holes and conductors in ferromagnetic sheet 41 is substantially different from that shown in FIGS. 1 and 2. In ferrite sheet 41, holes are drilled in pairs near each crosspoint or memory location. The holes at the intersections of vertical axis coordinates I, II, III and IV and horizontal axis coordinates 1, 2, 3, and 4 are threaded by conductors 45 which may be called drive conductors because the light beam may lower the impedance of the touching portion of photoconductor 42 so that the major portion of an input current pulse is applied across the drive conductor. The resulting current in the drive conductor is sufficient to switch its magnetic storage site if it has an opposing direction of magnetization. The other conductors 49 of each pair, to the left of their corresponding drive conductors in FIG. 3, may be called sense conductors because the changing magnetic flux in the magnetic material around one of them and its nearby drive conductor while that magnetic material is switching includes a voltage in that one conductor 49. The portions of photoconductor 12 immediately over the sense conductors 49 are preferably not illuminated by the light beam and are preferably insulated from sense conductors 49 as described hereinafter.

Conductors 45 and 49 are deposited in the holes in the same manner as in FIGS. 1 and 2. The center-to-center spacing of holes in a pair may be about 0.003 inch. In order to include such a pair of conductors within the same magnetic storage site and thus provide substantial inductive coupling between them, the drive current must be increased about four times, as compared to the embodiments of FIGS. 1 and 2. The spacing between storage sites, i.e., crosspoints must be increased approximately in proportion to the drive current, i.e., to about 0.010 inch, to allow for the increased drive currents and still provide isolation, that is, independent action, of the memory sites.

Conductive straps 48 are plated alternately on both surfaces of ferrite sheet 41 between successive ones of the sense conductors 49 to form a continuous sense winding in combination with sense conductors 49. In the arrangement shown, a strap stars at the edge of the surface of ferrite sheet 41 on which photoconductor layer 42 will subsequently be deposited and extends to the sense conductor 49 near coordinate 1–I. On the side opposite the side toward which the light beam is directed, as shown in FIG. 4, a strap 48 is plated to another sense conductor, i.e., the one near location 2–I, by a path which avoids ground electrode 44. This sequence continues until all the sense conductors 49 are included serially in the sense winding by conductive straps 48. A layer 53 of insulating material is deposited over straps 48 and sense conductors 49 on the front surface of ferrite sheet 41, to insulate the sense winding from drive conductors 45 and the layer 42 of photoconductor which is then plated or otherwise deposited on that surface of the ferrite sheet 41. Photoconductor 42 should be as thin as possible, that is, about one micron thick in order to reduce lateral conduction between drive conductors 45.

Output resistor 47 is connected across the ends of sense winding 48. The ground electrode 44 is plated on the back side, that is, the side opposite photoconductor 42, as shown in FIG. 4, between all of the drive conductors 45 by such paths as to avoid contact with sense winding 48.

Writing current pulser 54 operates the same as pulser 8 of FIG. 1. Read out pulser 46 also produces current pulses, since read out discrimination is not dependent on the waveform of the current flowing through drive conductors 45. The current pulses are supplied to the addressed memory site through transparent electrode 43 and ground electrode 44.

Assuming that the same information is stored as in the embodiments of FIG. 1 and 2, and assuming that for read out the light beam is deflected according to the scan sequence table of FIG. 1 the output voltages will vary as depicted by curve 52 in FIG. 3.

The switching of the direction of magnetization of the ferrite at the addressed memory site at time $t_2$ will produce far greater induced voltages in its sense conductor 49 than voltages induced by current pulses at times $t_1$ and $t_3$ which do not produce ferrite switching, the ratio being greater than the ratio of the leading edges of the "0" and "1" pulses from either of the devices 10 and 20 in FIGS. 1 and 2, respectively. Of course dark photoconductive leakage currents induce even smaller voltages in sense conductors 49 than do lit photoconductor currents which do not produce any ferrite switching. It is noted that, in all cases, the dark photoconductor leakage currents are not large enough to switch the magnetization of any portion of the ferrite. The pulse shaping circuit 55 improves the rectangularity of the pulse at time $t_2$ while blocking all input signals below a selected threshold level.

Figure 6:
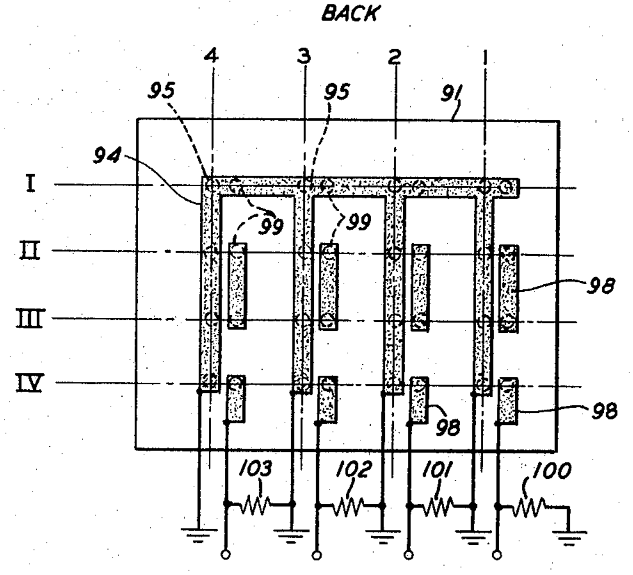
FIG. 6 is a plan view of the back of the device of FIG. 5.
Figure 5:
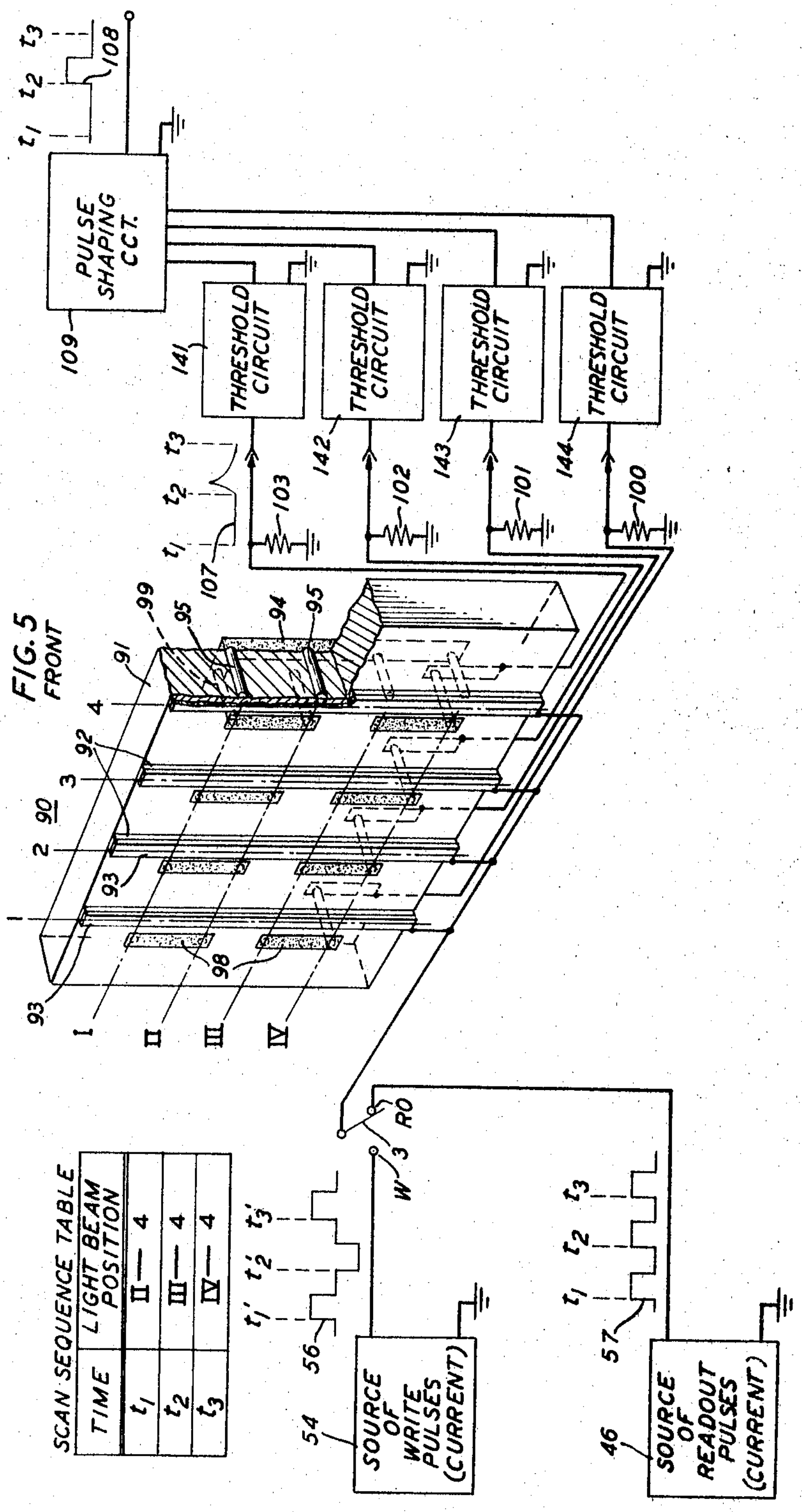
FIG. 5 is a partially cutaway perspective view of a device wherein the embodiment of FIG. 3 is modified for using a plurality of photoconductor strips and a plurality of sense windings.

FIGS. 5 and 6 illustrate a preferred embodiment of the invention which provides inductive or transformer-type sensing while eliminating the need for plating insulation over the sense windings. The embodiment of FIGS. 5 and 6 is similar to the embodiment of FIGS. 3 and 4 in providing drive conductors 95 and sense conductors 99 through transverse apertures in ferrite sheet 91 with spacings like that of FIGS. 3 and 4. The modifications included in device 90 include plating photoconductors 92 in narrow strips over drive conductors 95 in columns 1, 2, 3 and 4, and plating transparent electrodes 93 thereover. Conductive straps 98 include each column of sense conductors 99 serially in a separate sense winding and are plated between the aforesaid sense conductors alternately on opposite sides of ferrite sheet 91 with uniform spacing from the neighboring photoconductor strips 92 and transparent electrodes 93. This spacing provides all necessary insulation of sense windings 9 from electrodes 93 and photoconductors 92, so that separate insulation comparable to insulating layer 53 of FIG. 3 is not needed.

Ground electrode 94 is plated between drive conductors 95 on the back surface of ferrite 91, as shown in FIG. 6, by such paths as avoid sense windings 98, except that one end, for example in row I, of each sense winding 98 is connected to ground electrode 94. Output resistors 100, 101, 102 and 103 are connected between ground and the ungrounded ends of sense windings 98 for columns 1, 2, 3 and 4, respectively. Writing and reading are accomplished in the manner of the embodiment of FIG. 3, except that low level noise voltages are blocked from the output by threshold circuits 141 through 144, which may more easily distinguish noise from signal because of the subgrouping of memory elements provided by output resistors 101 through 104. The outputs of threshold circuits 141 through 144 are combined in the input of pulse shaping circuit 109, which is similar to pulse shaping circuit 55 of FIG. 3, and a rectangular pulse is produced at time $t_2$ at the output of circuit 109. According to the scan sequence table of FIG. 1, this binary "one" comes from the memory element at crosspoint III–4.

Figure 7:
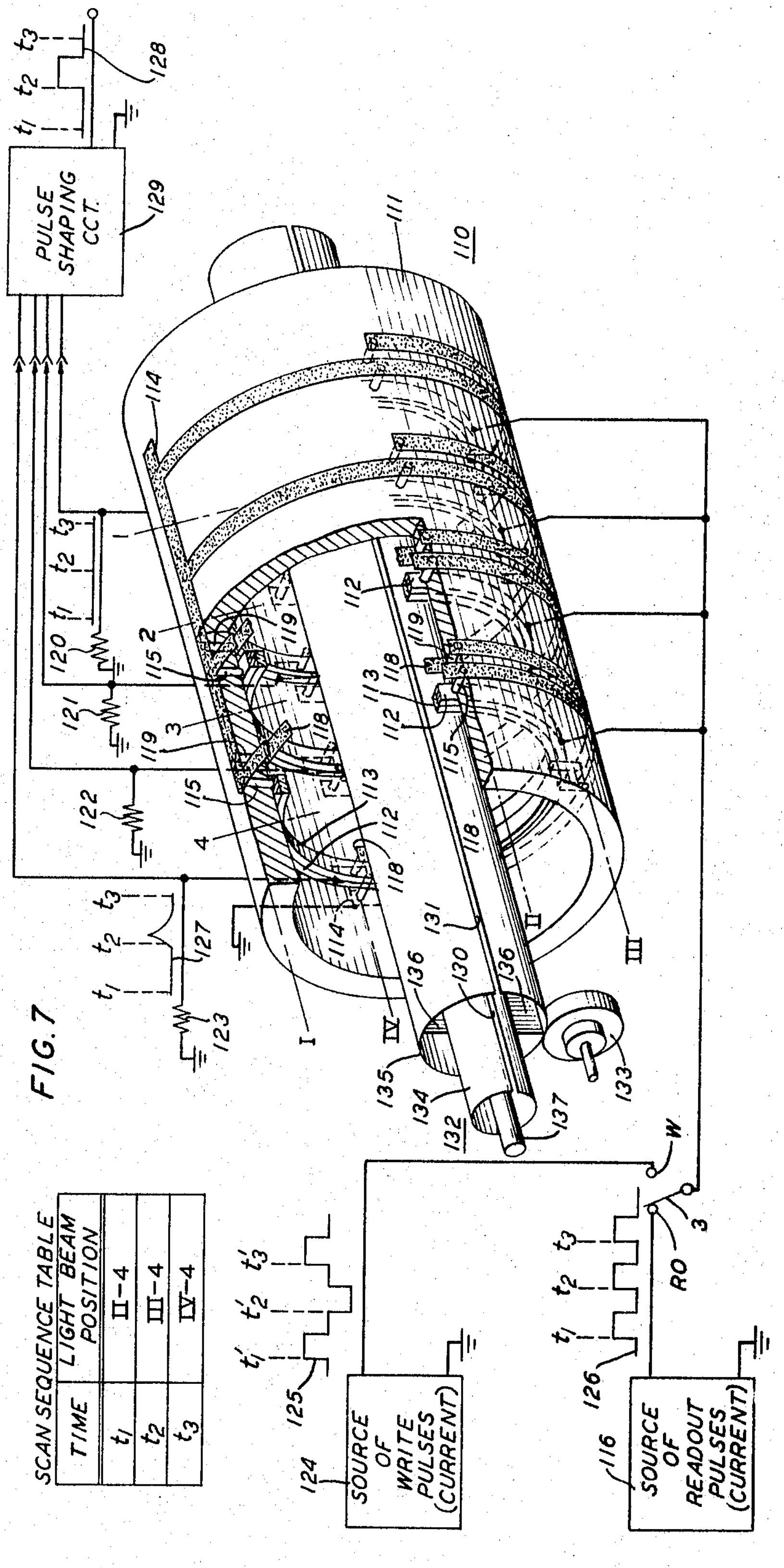
FIG. 7 is a partially cutaway perspective view of another embodiment of the invention comprising a photoresponsive magnetic device in cylindrical form.

It should be noted that the magnetic memory elements need not be arranged in a plane array, nor does the light beam have to be electrically deflected. These facts are illustrated in FIG. 7 wherein the magnetic device 110 comprises a cylinder of square-loop ferrite 111 with the arrangement of apertures, transverse conductors, photoconductors, et cetera as described in FIGS. 5 and 6, except photoconductors 112 are plated inside the cylinder as rings about its axis. In brief, the arrangement is the same as if the embodiment of FIGS. 5 and 6 were rolled up by bringing the top and bottom edges together, the seam being near the top in FIG. 7. The surface shown in FIG. 5 is inside the cylinder in FIG. 7, and the surface shown in FIG. 6 is outside the cylinder in FIG. 7. Parts of device 110 comparable to parts of device 90 are numbered twenty digits higher. Light beam source 132 comprises the stationary bulb 137 and concentric metal sheaths 134 and 135 around bulb 137, which sheaths are coupled by struts 136 and have aligned axial slits 130 and 131, respectively, for collimating a strip or ribbon beam from source 126. Sheaths 134 and 135 are mechanically mounted to be rotated around the axis of cylindrical memory device 110 by mechanical drive element 133. Source 125 generates a broad flat beam, i.e., a strip of light parallel to the axis of cylinder 110, which scans an entire row of magnetic storage sites simultaneously. Transparent electrodes 113 and ground electrodes 114 apply current pulses from pulsers 124 and 116 across photoconductors 112 and drive conductors 115 for writing and read out, respectively, as explained for previous embodiments of the invention.

It should be obvious that the interior and exterior surfaces of device 110 may be interchanged, source 132 then being mounted and rotated outside the cylinder 111 on an arm pivoted at the axis of the cylinder, with the leads for electrodes 113 and 114 and for the sense windings which include straps 118 and sense conductors 119 being brought out through a hollow center shaft of cylinder 111 to output resistors 120, 121, 122 and 123 which are connected across sense windings 118 for the axial coordinates 1, 2, 3 and 4, respectively.

The magnetic memory sites according to the invention might also be imbedded in a flexible material such as tape, so that a rigid spatial relationship between them does not exist.

In all cases, the above-described embodiments of the invention incorporating a distributed photoconductive access switch associated with a multiple site magnetic storage unit may be modified in a number of ways. For instance, the photoconductor may in all cases be plated in isolated spots over the appropriate transverse drive conductors. Wherever rectangular or perpendicular relationships have been shown, it is understood that curved or oblique relationships could be used. For instance, the transverse conductors might pass obliquely through the ferrite. Photoconductors might be curved, and sense windings might connect sense conductors in a curved sequence. Furthermore, various types of pulse discrimination and computing circuitry might be used with the invention. The description of the operation of the invention in conjunction with the light beam deflection apparatus described in the above-cited application of T. J. Nelson is intended to be illustrative without in any way limiting the invention.

It may be emphasized that the distributed photoconductive access switch not only simplifies and speeds access for read out but also permits equally rapid changing of the information stored in selected memory elements in situ without disturbing other memory elements; and the distributed magnetic storage sites provide the highly desirable stable switching thresholds.

The above-described arrangements are illustrative of a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. An information storage device comprising a body of magnetic material having substantial magnetic remanence, a layer of photoconductive material disposed upon one surface of said body, said photoconductive layer having a plurality of portions each having an illumination-dependent resistance different from the resistances of the others of said portions whenever illuminated differently from the others of said portions, a plurality of conductors extending through said body and each contacting said layer at one of said portions, and input-output circuit means including said layer for causing a current to flow through one portion of said photoconductive layer having the lowest of said resistances and thereafter to flow through one of said conductors contacting said one lowest-resistance portion.

2. The device according to claim 1 wherein the input-output circuit means includes a transparent layer of conductive material applied over said layer of photoconductive material and an electrical power source connected across said transparent layer and said conductors.

3. Information storage apparatus comprising a sheet of magnetic material known as a square-loop ferrite, a sheet of photoconductive material having resistance which decreases locally wherever illuminated, a plurality of conductors extending transversely through said magnetic sheet and separately contacting said photoconductive sheet, electrode means for conveying current serially through said photoconductive sheet and any one of said conductors, an electrical power source for supplying current to said electrode means, said electrode means being substantially transparent to a beam of light capable of affecting said photoconductive material, and means for supplying said beam of light to said material in the vicinity of one of said conductors.

4. An information storage device which may be addressed by a light beam, comprising magnetic material having a plurality of magnetic storage sites, a plurality of conductors each threading one of said sites, an electrical power source connected across said conductors, photoconductive material connected between said source and said conductors, said photoconductive material having a plurality of impedances each one effective between one of said conductors and said source, said one impedance being lower when said one site threaded by said one conductor is addressed by said light beam than when said one site is not addressed by said light beam and means for addressing said one site with said light beam.

5. The device according to claim 4 wherein the photoconductive material comprises a plurality of strips of said material each contacting a portion of said conductors.

6. The device according to claim 5 having a plurality of subgroups of said conductors and additionally including an output circuit having a plurality of signal paths and means for connecting each of said subgroups into one of said paths, each of said paths having a non-zero threshold for signal transmission.

7. An information storage device comprising a body of magnetic material having a substantial magnetic remanence, a layer of photoconductive material disposed on one surface of said body, said photoconductive material having resistance that depends on illumination of said photoconductive material, a first plurality of conductors extending through said body and separately contacting said layer, circuit means including said layer for causing a current responsive to said resistance to flow through one of said conductors, a second plurality of conductors each extending through said body in magnetic coupling vicinity of one of said first plurality of conductors, said second plurality of conductors being insulated from said layer of photoconductive material, and means for supplying said illumination to said material in the vicinity of one of said first plurality of conductors.

8. A device according to claim 7 in combination with conductive straps on the surfaces of said body connecting at least part of said second plurality of conductors in series, said straps being insulated from said layer of photoconductive material and from said first plurality of conductors.

9. A device according to claim 8 wherein the photoconductive material comprises a plurality of strips each disposed on one surface of said sheet in electrical contact with a portion of the first plurality of conductors.

10. A device according to claim 9 wherein the means for insulating the straps from the photoconductive material comprises spaced disposition of said straps and the photoconductive strips upon the one surface of said sheet.

11. A device according to claim 10 wherein the photoconductive strips have substantially greater lateral impedances between the first plurality of conductors than the impedances through said strips in the direction of the smallest dimensions of said strips.

12. A device comprising a magnetic storage unit having multiple storage sites forming a cylinder, a light source mounted for producing a strip beam which is rotatable about the axis of said cylinder to scan said sites, photoconductive material interposed between said source and said sites, and means for supplying current through portions of said photoconductive material illuminated by said light source to at least one of said sites.

13. A device comprising magnetic material having a plurality of magnetic storage sites each having means for passing current therethrough, a distributed photoconductive access switch for said sites, said access switch having a plurality of regions disposed to pass current therethrough whenever enabled to the current-passing means of the respective corresponding one of said sites, means for supplying current to all of said regions, and means for directing a light beam upon one of said regions to enable the passage of said current therethrough.

14. Information storage apparatus comprising a body of magnetic material having a plurality of storage sites positioned and adapted to be separately addressed by a beam of electromagnetic radiation, means for applying a field responsive to input binary information to said body, and means for conditioning the field response thresholds of said storage sites to be greater than said applied field in the absence of said beam and less than said applied field in the presence of said beam.

15. Information storage apparatus according to claim 14 in which the conditioning means includes a substantially transparent material interactive with said magnetic material, said substantially transparent material having a single stable state in the absence of said beam.

References Cited by the Examiner

UNITED STATES PATENTS

| | | | |
|---|---|---|---|
| 3,155,944 | 11/1964 | Oberg et al. | 340—174 |
| 3,257,648 | 6/1966 | Kai Chu | 340—174 |

JAMES W. MOFFITT, *Acting Primary Examiner.*

BERNARD KONICK, *Examiner.*

S. M. URYNOWICZ, *Assistant Examiner.*